April 13, 1954
H. F. CAUDILL
2,674,876
PILE TESTING MEANS
Filed Aug. 28, 1950
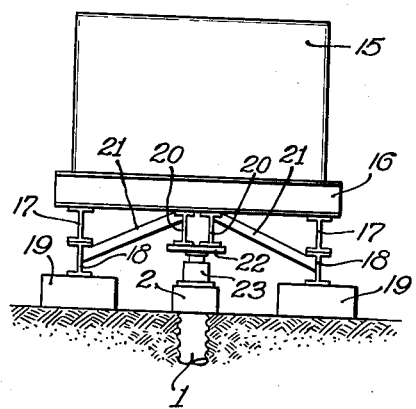
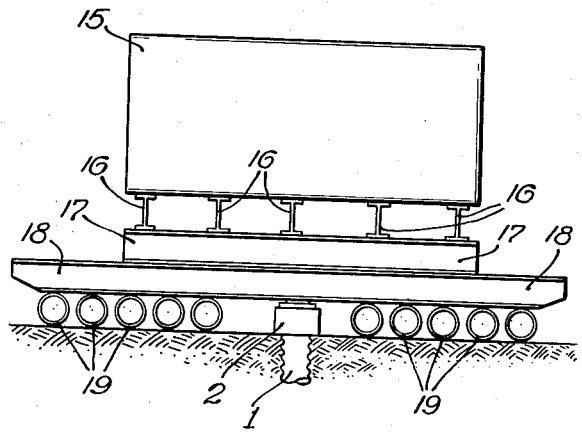
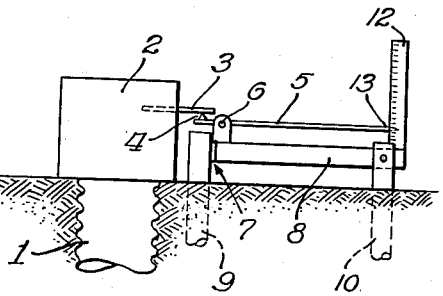
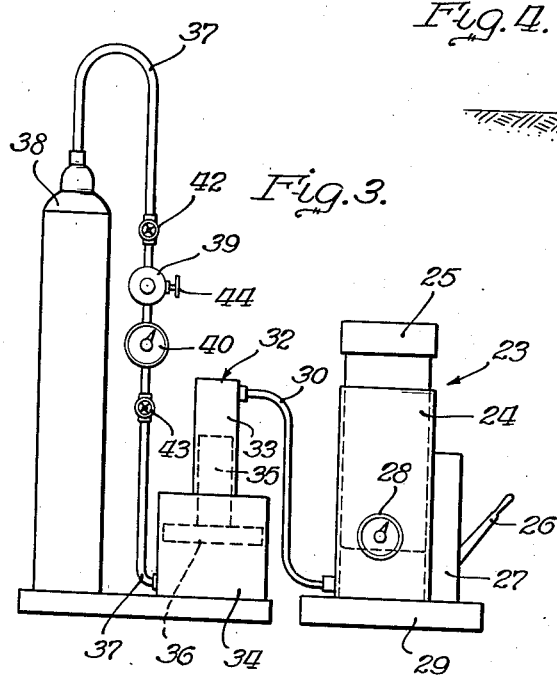
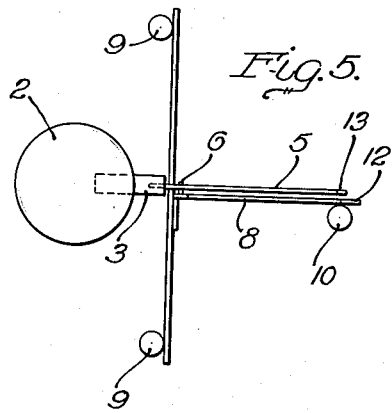
INVENTOR.
Howard F. Caudill
BY
Attys.

Patented Apr. 13, 1954

2,674,876

UNITED STATES PATENT OFFICE 2,674,876

PILE TESTING MEANS

Howard F. Caudill, Arlington Heights, Ill., assignor to Western Foundation Corporation, Chicago, Ill., a corporation of Delaware Application August 28, 1950, Serial No. 181,811

1 Claim. (Cl. 73—84)

My invention relates to means for testing the stability of a pile under a test load.

In placing foundations in a given location, a test pile may be installed, and loaded to a predetermined value to determine its stability under such load. Any pile or like load bearing foundation element may similarly be test loaded to determine its load bearing characteristics.

A method presently employed to test such a load bearing element is to dispose a sand box on suitable steel beams resting on ground engaging supports, such as a series of rollers, but extending over the test pile, and then to introduce a hydraulic jack between the top of the test pile and the steel beams supporting the sand box. The total load of the sand box is in excess of the load to be imposed upon the pile. The jack is then pumped up to the desired loading value, relieving the rollers of so much of the weight of the sand box as is assumed by the jack and the pile under it. Accurate indicating and measuring means in the form of a gauge or the like is applied to the test pile to indicate and measure its downward displacement under the load. Everything is lovely if the test pile under the test load shows no sinking, for then the load upon the pile remains the same, assuming, of course, that the jack does not leak. If, however, the test load causes the pile to sink, then the jack, which is unable to expand, loses its value as a strut between the loading means and the top of the pile, and the pile thereby loses its test load. It is to be understood, of course, that the test load is of a total weight in excess of the amount which the jack applies to the top of the test pile. In other words, the jack does not lift the test load clear of other support, but merely assumes the desired part of the total weight of the sand box, which is to be imposed upon the test pile as test load.

Hence, in order to insure that the loading of the test pile will be uniform throughout the entire period of the test, which may run as much as ten days, it is necessary to have a pile driver man in constant attendance every hour of the day to pump up the jack to the extent necessary to keep up the test load on the pile, and this calls for three shifts a day.

I have conceived the possibility of making the jack automatically self-extensible to maintain upon the test pile a predetermined part of the weight of the loading means, so that attendance upon the test by skilled workmen, or any attendant whatsoever, is unnecessary.

According to my invention, I place the loading means over the test pile and interpose the hydraulic jack in the usual manner. The jack may be pumped up to a point where the pressure gauge connected thereto indicates the proper loading upon the test pile. In other words, the jack takes up a certain part of the weight of the loading means and imposes it upon the top of the test pile. A suitable detecting and measuring means may be connected to the cap of the pile for detecting and measuring any sinking of the pile as it is kept under load. I conceived the possibility of making the hydraulic jack automatically expansible to keep the load on the pile by means of a gas bubble. The gas bubble directly connected to the liquid of the jack would be objectionable from several standpoints, first, that in order to compress it to the high pressure to which the liquid of the jack is subjected, a good deal of unnecessary work would be involved. Second, gas under such high pressure would be dangerous. I conceived the possibility of providing an expansion chamber for gas at a relatively low pressure, but operating a booster upon the liquid of the hydraulic jack so as to secure the effect of a bubble for maintaining the jack under pressure. A bubble or body of compressed gas in a hydraulic system would, by expansion, lose pressure directly in proportion to the expansion, as is well known in accordance with the gas laws. I conceived therefore the possibility of securing the effect of a very large gas bubble by utilizing a bottle of high pressure gas, such, for example, as nitrogen under 2000 pounds p. s. i., and supplying the gas through an automatic pressure reducing valve to the compensating chamber of the booster.

With this combination it is possible to load a test pile with a minimum of handling and labor, and even though the test pile should sink a slight amount to attain a stable position, no attendance is necessary since the device of my invention maintains the test load at the value predetermined by the setting of the automatic pressure reducing valve and the design proportions of the booster.

Now in order to acquaint those skilled in the art with the manner of constructing and operating a device of my invention, I shall describe, in connection with the accompanying drawings, a specific embodiment of the same.

In the drawings:

Figure 1 is an end view of the loading means superposed upon the test pile with the jack interposed;

Figure 2 is a side elevational view of the same;

Figure 3 is a side elevational view more or less diagrammatic of the jack, the booster, and the gas bottle showing the connections of the same;

Figure 4 is a side elevational view of the gauge and frame for detecting the sinking of the pile under load; and Figure 5 is a top plan view of the mechanism shown in Figure 4.

As shown in Figures 1 and 4, the test pile 1 is driven into the ground to a suitable depth, or to a suitable stratum to provide support for a structure to be erected upon piles. The pile 1 may be constructed in any suitable manner, that is to say, it may be a driven pile, a cast-in-place pile, a pile of the rock-socketed type, or any type which it is desired to test. The said pile 1 is provided with a cap 2 resting upon the upper end of the pile. It is customary to load such a test pile over a period of time necessary for it to come to a stable position where it will support a load without any further downward displacement. This may invlove the pile sinking a slight amount initially under the applied pressure. If the support which the pile gains from the earth is stable, the amount of sinking under the load will be small, and will shortly after the load is applied reach a stable position with no further sinking. It has been customary to put such piles under load by a dead weight imposed thereupon. So long as the pile moves downward, ever so slightly, the pressure of the test load is allowed to remain upon it. Then when the pile takes the load and holds a fixed position to the thousandth of an inch within forty-eight hours after the last movement of 1/64 inch has occurred, the pile is regarded as stable and capable of supporting its load indefinitely. The pressure for carrying on this test must be continuous, otherwise the test becomes meaningless. Such a test may run as much as ten days. In Figures 4 and 5, I have illustrated a mechanism for indicating any movement of the test pile 1. It consists of an extending finger 3 attached to the cap 2 and bearing down against a pivot point 4 of an indicator lever 5 pivoted intermediate its ends at 6 on a stationary frame 7 which may consist of a T-frame including the horizontal bar 8 supported on three pipe stakes 9, 9 and 10 driven into the ground adjacent the test pile 1. This T-frame carries at the right a vertical scale 12 over the graduations of which the pointer 13 of the indicating arm 5 plays to indicate in lineal units or appropriate fractions thereof the extent of downward sinking of the pile 1. By the leverage system thus shown, the indication is multiplied so as to be readily legible upon the scale or gauge 12. A multiplication of ten to one has been found to be suitable. Obviously, any other means for detecting the sinking of the pile and measuring the amount thereof may be employed, although the above mechanism has been found to be simple and satisfactory.

In order to provide a suitable test load for testing the pile 1, a sand box 15, which may be made of metal side walls and bottom suitably secured together, is rested upon a series of transverse girders 16 which are in the form of short lengths of I-beam.

A suitable dimension for the sand box to provide a loading of 90 tons would be 8 feet x 9½ feet x 17½ feet.

Longitudinal steel beams, in the form of I-beams 17, 17, at each side underlie and are adapted to support the transverse beams 16, 16. These longitudinal beams 17, 17 in turn rest upon skid beams 18, 18 immediately below them. The skid beams 18, 18 in turn are supported upon tubular steel pipe rollers 19, 19 at each side, which pipe rollers rest upon the ground to support the above parts when the test is not being run, and to support a part of the load when the test is being run.

A pair of I-beams 20, 20, and a central plate 22, are supported below the transverse beams 16, 16 in position to be engaged by the jack 23, resting upon the cap 2 of the pile 1 when the movable load platform is rolled into position over the test pile 1. The load of the sand box may be taken off of the longitudinal beams 17, 17 by lifting the central beams 20, 20.

The various beams, transverse and longitudinal, as well as the skid beams 18, may be connected together, and connected to the central longitudinal beams 20, 20, either permanently, or preferably in releasable form, so that the load platform may be broken down into its component parts and more easily transported. Diagonal struts or braces 21, 21 may be employed to brace the structure against transverse horizontal force components. Any suitable form of connection and bracing of the parts which will provide a movable load platform capable of giving a total weight of approximately 90 tons for this particular test will be suitable. The load platform shown may be transported from one place to another on the pipe rollers 19, 19.

The jack 23 of Figure 1 is shown in greater detail in Figure 3. It comprises a cylinder member 24 and a piston or plunger 25 in suitable sliding and fluid-tight relation. An operating handle 26 for a pump 27 for pumping up the jack to the desired initial loading of the test pile is provided. The cylinder 24 is provided with a pressure gauge 28 which is graduated in tons load carried on the plunger 25 of the jack. The jack in the specific example is a 100-ton jack. The cylinder 24 is connected by a flexible high pressure hose 30 to the liquid or hydraulic cylinder 33 of the booster 32. This hose 30 is preferably unobstructed for transmission of pressure and flow of fluid in either direction. The booster 32 comprises a liquid or hydraulic cylinder 33 and a gas or pneumatic cylinder 34, preferably connected together mechanically with a liquid or hydraulic piston or plunger 35 fitting the hydraulic cylinder 33 and a gas or pneumatic piston or plunger 36 fitting the pneumatic cylinder 34, these two plungers being mechanically connected, so that they move as a unit. To the bottom of the pneumatic chamber 34 there is connected a high pressure lead 37 leading to the high pressure gas bottle 38, which, in the present instance, is compressed nitrogen at an initial pressure of 2000 pounds per square inch. In the connection 37, there is a pressure gauge 40 which is preferably graduated directly in terms of tons supported by the ram or plunger 25 of the hydraulic jack 23. An adjustable diaphragm type automatic pressure regulator 39 is connected in the gas connection 37 above the gauge 40. Above the pressure regulator 39, the pressure in the connection 37 is equal to the pressure in the bottle 38. The pressure in the connection 37 below the regulator and imposed upon the gauge 40 and upon the pneumatic cylinder 34 is that which is determined by the setting of the pressure regulator. Shut off valves 42 and 43 are disposed in the connection 37, so that the regulator and gauges 39 and 40 may be disconnected where it is desired to disconnect the parts, as for transport.

In an example of testing a test pile with an 80-ton load, the hydraulic pressure or oil pressure in the cylinder 24 of the jack 23 is 3200 pounds p. s. i. This pressure also prevails in the hydraulic cylinder 33 of the booster 32. In the pneumatic cylinder 34, which constitutes a compensating chamber, the pressure of nitrogen gas is 290 pounds per square inch. The ratio of areas of the pistons 36 and 33 is inversely in proportion to the pressures upon them, since the movable system normally lies in equilibrium.

The main jack 23 is arranged to have a total 9 inch stroke, and the so called "watch dog" booster 32 has a displacement equivalent to only a 1 inch stroke of the jack, since the amount which the test pile may sink, and still be satisfactory, is generally only a fraction of an inch.

In a test with the jack 23 placed with its base 29 on top of the pile cap 2, and its ram 25 engaging the loading plate 22, the jack is pumped up by means of the handle 26 and pump 27 until the gauge 28 indicates that a suitable load, for example, 80 tons, is being applied to the test pile.

This initial pumping up of the jack cylinder will tend to force the plunger 35 and its connected plunger 36 downwardly to the lower end of the possible stroke of these two plungers. When the load has been brought substantially to the desired figure, as indicated by the gauge 28, the valves 42 and 43 will be opened, and the gas admitted by the regulator 39 to the compensation chamber 34, will drive the plunger system upwardly sufficiently to impose and maintain a pressure on the jack cylinder of a predetermined value corresponding to the reading in tons on the gauge 40.

A suitable valve for venting the pressure in the compensating chamber may be provided. The same has, for purpose of clearness, been omitted from the illustration. The automatic pressure regulator 39 may be of any well known type in which the hand wheel 44 loads the controlling spring and diaphragm to the desired value, so that when the pressure on the delivery side exceeds a predetermined value, the valve will be completely shut off. When the pressure on the delivery side drops below the predetermined value, the valve will tend to open and admit additional pressure to bring the pressure on the delivery side of the desired predetermined value. Such pressure regulating valves for automatically holding a predetermined pressure on the delivery side independently of variations of pressure on the high pressure side (so long as they are higher than the pressure on the delivery side), are well known to those skilled in the art, and need not be detailed here.

As soon as full pressure, as indicated by the gauge 40, has been imposed upon the test pile, so much of the load of the movable load platform as is carried by the jack 23 on the test pile 1 is taken off of the rollers 19, 19, but, except for the spring in the loaded parts, no substantial movement occurs. The indicator and measuring device shown in Figures 4 and 5 will give an indication of any downward travel of the pile 1 in the course of loading. The test equipment may be inspected periodically, to determine what if any travel downwardly has occurred within the said test period. When the pile holds the load without further sinking for 48 hours after the last movement of 1/64 inch, the test is regarded as completed.

It is to be observed that the gas pressure which the regulator imposes upon the compensating chamber of the booster is relatively low, for example 290 pounds p. s. i., and hence the danger of explosion or blowout is inconsequential, yet at the same time, the pressure in the connected hydraulic booster chamber 33, and in the cylinder of the jack 23, is high. In the above example, the oil in the hydraulic system is at 3200 pounds per square inch pressure. Thus, by means of the booster, I obtain the effect of a gas bubble of very large size, with substantially none of the disadvantages which would be entailed in an actual direct contact gas bubble carried at the pressure of the hydraulic liquid in the jack.

I do not intend to be limited to the details described and claimed, as they are illustrative, and not intended to be any more limiting than is required by the appended claim.

I claim:

For use in a pile testing device having loading means for providing a downward load on a test pile in excess of the load to be imposed on the pile and a load support supported independently of the pile over the pile, the loading means being disposed over the pile to load the same to a desired value, in combination, a hydraulic jack having a cylinder and a piston disposed between the pile and the loading means and having a working liquid in the cylinder, said cylinder and piston being disposed to transmit the desired part of the load from the loading means to the pile by means of the liquid in said cylinder, a booster having a hydraulic chamber and a gas chamber and connected pistons for said chambers, said hydraulic chamber and its piston being of a cross sectional area substantially less than the cross sectional area of said gas chamber and its piston, a conduit connecting said hydraulic chamber of said booster and said cylinder of said hydraulic jack to accommodate flow of the working fluid of said jack to and from said hydraulic chamber and the cylinder of said jack, a second conduit adapted to establish communication between said gas chamber and a source of gas under pressure, and a pressure reducing valve in said second conduit adjacent the source of gas under pressure to reduce the pressure of the gas in said second conduit and said gas chamber, whereby the gas in said second conduit and said gas chamber is maintained at a low and safe pressure to apply a substantial load on the working liquid in said hydraulic chamber and the cylinder of said jack to maintain the working liquid at a high but safe working pressure, and whereby said reducing valve maintains a uniform pressure on the gas and thus on the working liquid to maintain uniform transmission of the desired part of the load from the loading means to the pile.

References Cited in the file of this patent

UNITED STATES PATENTS

| Number | Name | Date |
|---|---|---|
| 1,993,103 | Labarre | Mar. 5, 1935 |
| 2,344,133 | Davis | Mar. 14, 1944 |
| 2,354,562 | Webb | July 25, 1944 |
| 2,597,404 | Teske | May 20, 1952 |

FOREIGN PATENTS

| Number | Country | Date |
|---|---|---|
| 321,524 | Great Britain | Nov. 14, 1929 |
| 770,245 | France | June 25, 1934 |